W. R. EVERITT.
COUPLING FOR HAY RAKES AND LOADERS.
APPLICATION FILED FEB. 14, 1910.
973,417.
Patented Oct. 18, 1910.
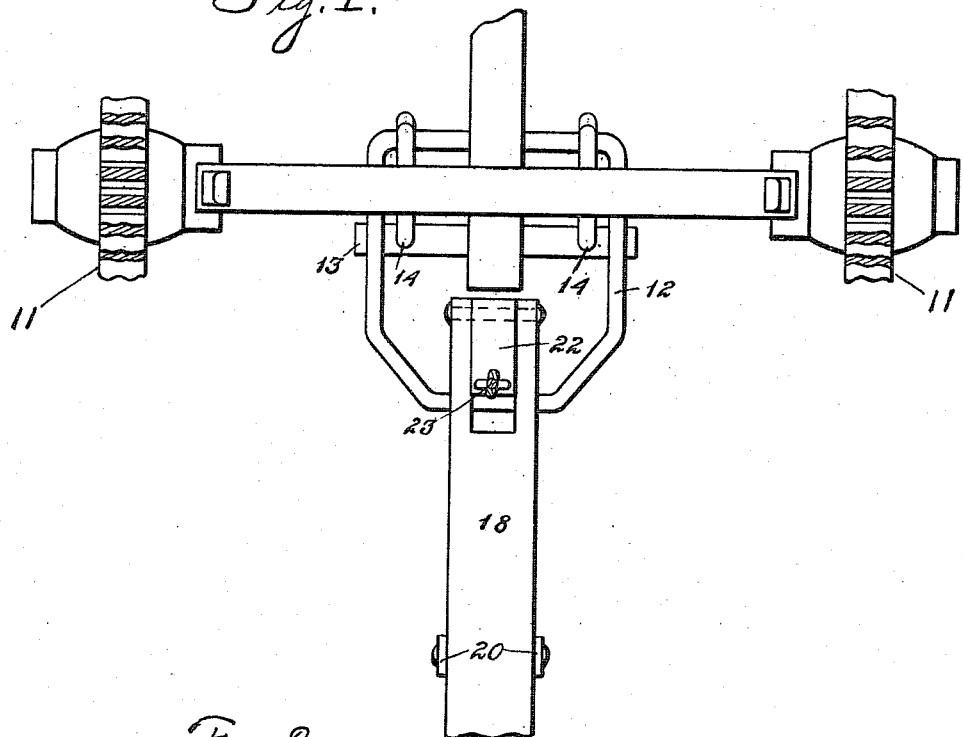
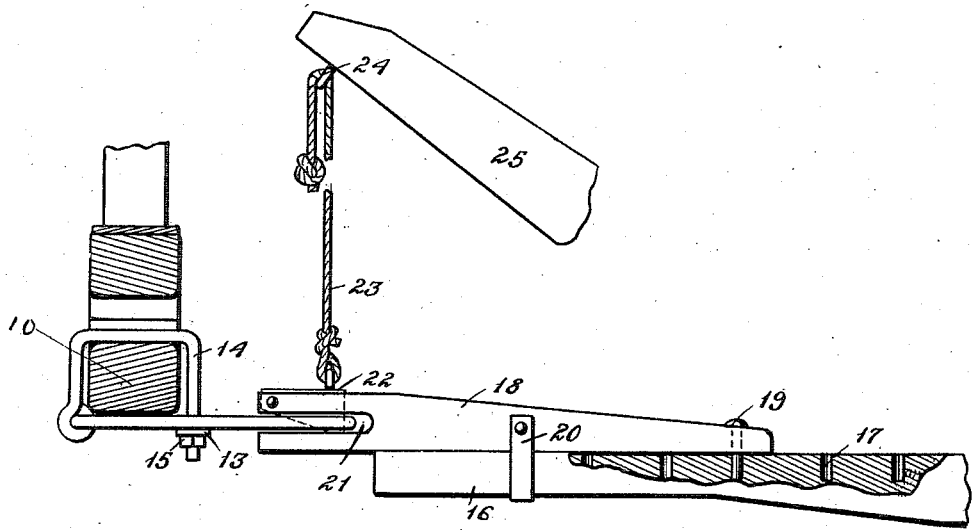
Witnesses.
W. O. Loftus.
F. C. Caswell
Inventor.
William R. Everitt.
by J. Ralph Onwig Atty.

UNITED STATES PATENT OFFICE.

WILLIAM R. EVERITT, OF MUSCATINE, IOWA.

COUPLING FOR HAY RAKES AND LOADERS.

973,417.  Specification of Letters Patent.   Patented Oct. 18, 1910.

Application filed February 14, 1910. Serial No. 543,854.

*To all whom it may concern:*

Be it known that I, WILLIAM R. EVERITT, a citizen of the United States, residing at Muscatine, in the county of Muscatine and State of Iowa, have invented a certain new and useful Coupler for Hay Rakes and Loaders, of which the following is a specification.

My invention relates to that class of couplers intended to be used for connecting a hay rake and loader with a wagon containing a hay rack which coupler may be uncoupled by means of a rope supported from the upper end of the hay rake and loader so that the operator need not go between the hay rake and loader and the wagon in order to uncouple.

My object is to provide a device of this kind of simple, durable and inexpensive construction so arranged that the part to be attached to the wagon may be permanently secured in position and the part attached to the hay rake and loader may be readily and quickly adjusted to project a greater or less distance in front of a hay rake and loader so that the rod for use in uncoupling may extend from the coupler upwardly to the top of the hay rake and loader frame to a position where it will not be engaged by the rear end of a hay rack on the wagon, it being understood that hay racks vary considerably in the amount they extend rearwardly beyond the rear axle of the wagon.

My invention consists in certain details, in the construction, arrangement and combination of the various parts of the device whereby the objects contemplated are attained, as hereinafter more fully set forth, pointed out in my claims and illustrated in the accompanying drawings, in which:

Figure 1 shows a top or plan view of the rear axle of a wagon with my improved coupling device applied thereto and the rear end thereof being broken away, and Fig. 2 shows a detail, sectional view of the axle with my improved device applied thereto, the rear portion of the coupler being shown partly in section to illustrate the details of construction.

Referring to the accompanying drawings, I have used the reference numeral 10 to indicate the rear axle of a wagon and 11 the supporting wheels thereon.

The part of my improved coupler that is designed to be attached to the wagon comprises a substantially oblong loop made of metal rod and indicated by the numeral 12. A cross piece 13 is extended under the central portion of the loop 12. Two substantially U-shaped bolts 14 are pivoted at one end to the forward portion of the rod 12 and are extended through the cross piece 13, and a nut 15 is applied to the lower end of each of said bolts. The device is permanently applied to the rear axle of a wagon by first extending the U-shaped bolts around the axle then through the cross piece 13 and then firmly fixing the nuts 15 in position. This will hold the rod 12 in a substantially horizontal position firmly fixed to the wagon axle.

The part of my coupler that is attached to the hay rake and loader comprises a flat topped bar 16 fixed to the hay rake and loader and extended straight forwardly therefrom. In this top is a series of round openings 17. Slidingly mounted on top of the bar 16 is a block 18 having at its rear end a detachable pin 19 designed to enter the openings 17. At its central portion is a metal loop 20 fixed to the block 18 and extended downwardly along the sides and under the bottom of the bar 16 to thereby prevent vertical movement of the block 18 relative to the bar 16 but so arranged that the block 18 may freely slide longitudinally on the bar 16. In the forward end of the block 18 is a horizontally arranged slot 21 designed to receive the rear portion of the rod 12 and pivoted in the block 18 above the slot is a coupling jaw 22 pivoted at its forward end and having its rear end designed to rest on the forward portion of the block 18 below the slot 21, and in front of the adjacent portion of the rod 12. Fixed to the coupling jaw 22 near its rear end is a rope 23 extended upwardly through an eyelet 24 which eyelet is mounted in the upper portion of the main frame 25 of the hay rake and loader. Obviously by pulling upwardly upon this rope the rear end of the coupling jaw is moved upwardly which will release it from the rod 12, whereupon the wagon may be moved forwardly away from the hay rake and loader.

In practical use, it is to be understood that ordinarily a number of wagons with hay rakes thereon are used in connection with a single hay rake and loader and it also frequently happens that a number of these wagons have hay racks that project different distances beyond the rear axle. However in connecting a wagon with a hay rake and loader, the operator first backs the wagon to position where the rod 12 will enter the slot 21 and the coupling jaw will then drop to position for coupling the parts together. If the hay rack should extend rearwardly far enough to engage the rope 23, then the operator removes the pin 19 and slides the block 18 rearwardly until the rope is clear of the hay rack. He then inserts said pin in the adjacent one of the openings 17 so that the rope may be freely moved without being interfered with by the hay rack. It is obvious that the entire device may be constructed at a minimum of expense and at the same time will efficiently carry out the purpose for which it is intended.

I claim as my invention:

1. In a coupler of the class described, the combination of a coupler member designed to be attached to a wagon and having a rod in the rear of the wagon extending substantially parallel with the wagon axle, a coupler member designed to be attached to a hay rake and loader or the like comprising a bar extended forwardly and having a flat top provided with a series of vertically arranged openings, a block slidingly mounted thereon, a loop fixed to the block and extended around the sides and underneath the said bar, a pin detachably mounted in the rear of the block to enter said openings in the bar, the forward end of the block being provided with a slot to receive the coupler member on the wagon and a coupling jaw mounted in the block above the slot, for the purposes stated.

2. A device of the class described, comprising a coupler member designed to be connected to a wagon axle and comprising a rod formed in a substantially oblong shape, a cross piece at the center of said rod, two substantially U-shaped bolts pivoted to the forward portion of the rod and designed to encircle the top and sides of a vehicle axle and having their rear ends designed to extend through said cross piece, nuts applied to said rear ends beneath the cross piece, a coupler member designed to be attached to a hay rake and loader or the like comprising a flat topped bar having openings in its top, a block slidingly mounted thereon, a loop fixed to the sides of the block and extended downwardly along the sides of the bar and across the bottom of it, a pin detachably mounted in the rear of the block to enter the openings in the bar, the forward end of the block being designed with a slot to receive the coupling member on the wagon, a pivoted coupling jaw mounted in the block above the slot, a rope attached to the rear end of the pivoted jaw and an elevated support for said rope, substantially as, and for the purposes stated.

Des Moines, Iowa, Feb. 3, 1910.

WILLIAM R. EVERITT.

Witnesses:
 POWELL D. SOWERS,
 ORVAL E. MONGERSON.